US010633554B2

(12) United States Patent
Ruan et al.

(10) Patent No.: US 10,633,554 B2
(45) Date of Patent: Apr. 28, 2020

(54) SURFACE MODIFICATION METHOD BASED ON POLYMERIZATION AND CROSS-LINKING SOLIDIFICATION OF DOPAMINE AND/OR DERIVATIVES THEREOF (71) Applicant: Dalian University of Technology, Dalian, Liaoning Province (CN)

(72) Inventors: Xuehua Ruan, Dalian (CN); Gaohong He, Dalian (CN); Xuxing Liao, Dalian (CN); Yan Xu, Dalian (CN); Xiaoming Yan, Dalian (CN); Yan Dai, Dalian (CN); Ning Zhang, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/323,452

(22) PCT Filed: Dec. 11, 2017

(86) PCT No.: PCT/CN2017/115475
§ 371 (c)(1),
(2) Date: Feb. 5, 2019

(87) PCT Pub. No.: WO2018/113547
PCT Pub. Date: Jun. 28, 2018

(65) Prior Publication Data
US 2019/0177570 A1    Jun. 13, 2019

(30) Foreign Application Priority Data

Dec. 19, 2016  (CN) .......................... 2016 1 1178888

(51) Int. Cl.
*C09D 165/00* (2006.01)
*C08G 61/12* (2006.01)
(Continued)

(52) U.S. Cl.
CPC ......... *C09D 165/00* (2013.01); *C08G 61/124* (2013.01); *C08J 7/0427* (2020.01);
(Continued)

(58) Field of Classification Search
CPC .... C09D 165/00; C08G 61/124; B05D 3/007; B05D 3/0254
See application file for complete search history.

(56) References Cited

U.S. PATENT DOCUMENTS

2003/0068317 A1* 4/2003 Lee ........................ C07H 21/00
                                                                  424/140.1
2014/0054221 A1* 2/2014 Agnihotri .............. B01D 71/56
                                                                  210/636

(Continued)

FOREIGN PATENT DOCUMENTS

| CN | 102248726 A | 11/2011 |
| CN | 102614789 A | 8/2012 |
| CN | 106750462 A | 5/2017 |

OTHER PUBLICATIONS

Yan Lv, Hao-Cheng Yang, Hong-Qing Liang, Ling-Shu Wan, Zhi-Kang Xu. Nanofiltration membranes via co-deposition of polydopamine/polyethylenimine followed by cross-linking. Nov. 24, 2014. Elsevier. Journal of Membrane Science. 476. 50-58 (Year: 2014).*

(Continued)

*Primary Examiner* — Dah-Wei D. Yuan
*Assistant Examiner* — Kristen A Dagenais-Englehart
(74) *Attorney, Agent, or Firm* — Muncy, Geissler, Olds & Lowe, P.C.

(57) ABSTRACT

The present invention provides a surface modification method based on the polymerization and cross-linking solidification of dopamine and/or its derivatives, which belongs to the technical field about composite material fabrication. The principle of dopamine polymerization and the formation process of polydopamine coating layer are the (Continued)

foundation of the present invention. This innovative method is established after deeply analyzing the failure mechanism of polydopamine coating layer in severe environments, such as organic solvents and acidic/alkalic environments. The critical work is finding out an eligible cross-linking agent which could react with the active functional groups in polydopamine. After cross-linking reaction, the soluble low-molecular-weight dopamine oligomers could be transformed into the insoluble three-dimensional stereographic networks. In this instance, the interaction between polydopamine molecules, and the adhesion between polydopamine coating layer and substrate materials, can be significantly strengthened. After the cross-linking solidification, the hydrophilic polydopamine coating layer could be stable and effective for long-term utilization in severe environments, e.g., organic solvents and acidic/alkalic environments, and thereby expand the application scope of the surface modification method based on dopamine polymerization greatly.

10 Claims, 5 Drawing Sheets

(51) Int. Cl.
 C08J 7/12 (2006.01)
 C08J 7/04 (2020.01)
(52) U.S. Cl.
 CPC .............. *C08J 7/12* (2013.01); *C08G 2261/11* (2013.01); *C08G 2261/12* (2013.01); *C08G 2261/3241* (2013.01); *C08G 2261/43* (2013.01); *C08G 2261/76* (2013.01); *C08J 2327/16* (2013.01); *C08J 2479/02* (2013.01)

(56) References Cited

U.S. PATENT DOCUMENTS

2014/0221522 A1* 8/2014 Antoni .................... A61L 27/34
 523/105
2015/0122121 A1* 5/2015 McGrath .............. B01D 53/228
 95/45

OTHER PUBLICATIONS

Xi, Zhenyu et al., "A Facile Method of Surface Modification for Hydrophobic Polymer Membranes Based on the Adhesive Behavior of Poly(DOPA) and Poly(dopamine)," Journal of Membrane Science, vol. 327, Issue Nos. 1-2, Nov. 30, 2008, pp. 244-253 (XP-025917519).

Lv, Yan et al.; "Nanofiltration Membranes via Co-Deposition of Polydopamine/Polyethylenimine Followed by Cross-Linking," Journal of Membrane Science, vol. 476, Feb. 15, 2015, pp. 50-58, (available online Nov. 24, 2014), (XP-055509939).

Shi, Huyan et al., "Fouling-Resistant and Adhesion-Resistant Surface Modification of Dual Layer PVDF Hollow Fiber Membrane by Dopamine and Quaternary Polyethyleneimine," Journal of Membrane Science, vol. 498, Oct. 22, 2015; pp. 39-47 (XP-055509945).

* cited by examiner

SURFACE MODIFICATION METHOD BASED ON POLYMERIZATION AND CROSS-LINKING SOLIDIFICATION OF DOPAMINE AND/OR DERIVATIVES THEREOF

FIELD OF THE INVENTION

The present invention relates to the surface modification method based on the polymerization and cross-linking solidification of dopamine and/or its derivatives, which belongs to the technical field about composite material fabrication. Particularly, this method focuses on the cross-linking solidification with appropriate curing agents for polymerized dopamine and/or its derivatives, thereby enhancing the stability and prolonging the service life of hydrophilic modification layers in organic solvents and acidic/alkalic environments.

BACKGROUND OF THE INVENTION

Surface modification for substrate materials is an available approach which can not only endow new properties through forming functional surfaces but also maintain the inherent performance. In other words, the advantages of various materials can be combined together by surface modification for the needs in production and life. The usually used surface modification methods can be summarized into three categories: chemical grafting, e.g., atom-transfer radical-reaction, interface cross-linking, element substitution; physical compounding, e.g., particle doping, surface coating, blending; physicochemical grafting, e.g., radiation grafting, plasma treatment, photo-initiated grafting. Hereinto, chemical grafting methods are achieved with the reaction between the modification reagent and the substrate materials, which would change the molecule structure of the substrate materials, and consequently impair the inherent performance to a certain extent, e.g., mechanical strength and chemical durability, etc. Physical compounding methods are based on the non-covalent interaction between the substrate materials and the surface modification layer. In the case that the substrate materials and the modification materials are significantly differing from each other in properties, they can hardly combine together with high strength, so that the functional surface layer is easy to be damaged in use, and resulting in regressive performance and short service life.

Surface modification based on dopamine polymerization is a newly developed but highly efficient technology inspired by mussel adhesion. It is a new direction for fabricating high performance composite materials, and the foundation is the oxidative auto-polymerization of dopamine and/or its derivatives on substrate surface. Since the first report in 2007, surface modification based on dopamine polymerization has been widely attempted in many fields, e.g., biological imaging, probing for drug tracing, photo-catalysis and water processing. Polydopamine modification has two advantages: 1) The modification is carried through merely with the oxidative auto-polymerization of coating monomers, and the molecular structure of substrate materials is unchanged, so that the advantages of various materials could be combined better; 2) The coating monomers, i.e., dopamine and/or its derivatives, are amphiphilic materials, which can be adsorbed intensively on most of inert materials and have good adaptability. Much more, the coating layer formed by dopamine (and/or its derivatives) polymerization has abundant active groups, e.g., amino, imino and phenolic hydroxyl groups, which can be employed as the intermediate layer for further modification and then combine the advantages of different materials difficult to be combination.

After a long-term investigation, the limitations of surface modification based on dopamine polymerization have been recognized. The stability of the polydopamine in organic solvents (or aqueous solutions containing organic solvents) and acidic/alkalic environments is poor, which is an bottleneck restricting polydopamine modification in practical application. This instability can be attributed to the low-molecular-weight oligomers of dopamine, which are variable in solubility in the polymerization process and could deposit on the substrate materials more or less along with the precipitation of high-molecular-weight polydopamine for modification. Under the environment of organic solvent or acidic/alkalic solution, the dopamine oligomers could be dissolved gradually in the long-term utilization, which would seriously impair the dense degree and the continuity of the polydopamine coating layer for surface modification, and thereby affect the long-term stability, limit the application scope.

Given all that, with the intent to further expand the application scope of surface modification technology based on dopamine polymerization, it is necessary to enhance the long-term stability of polydopamine coating layer in organic solvents (or aqueous solutions containing organic solvents) and acidic/alkalic environments. Accordingly, the procedure about cross-linking solidification is proposed in the present invention to convert the soluble low-molecular-weight dopamine oligomers into their insoluble three-dimensional networks, which can greatly reduce the dissolution of coating layer in organic solvents and acidic/alkalic environments, and thereby enhance the stability and the service life of polydopamine coating layer for surface modification. Such a procedure is established reliably on the basis including the polymerization principle of dopamine, the formation process of coating layer, as well as the failure mechanism of polydopamine coating in severe environments. In order to realize the cross-linking solidification, the crucial matter is to screen an eligible cross-linking agent which can react with the active functional groups of polydopamine.

SUMMARY OF THE INVENTION

The purpose of the present invention is to provide a surface modification method based on the polymerization and cross-linking solidification of dopamine and/or its derivatives. This method is established after deeply analyzing the failure mechanism of polydopamine coating layer in severe environments, such as organic solvents and acidic/alkalic environments. The critical work is finding out an eligible cross-linking agent which can react with the active functional groups in polydopamine. Through the cross-linking reaction, the soluble low-molecular-weight dopamine oligomers can be transformed into the insoluble three-dimensional stereographic networks. In this instance, the interaction between polydopamine molecules, and the adhesion between polydopamine coating layer and substrate materials, can be significantly strengthened. After the cross-linking solidification, the polydopamine coating layer could be stable and effective for long-term utilization in severe environments, e.g., organic solvents and acidic/alkalic environments, and thereby greatly expand the application scope of the surface modification method based on dopamine polymerization.

The technical solution of the present invention is as follows:

The surface modification method based on the polymerization and cross-linking solidification of dopamine and/or its derivatives comprises the following steps:

1) Preparation of polydopamine coating layer for modification: immersing the to-be-modified substrates into the solution containing dopamine and/or its derivatives, or coating the solution containing dopamine or its derivatives onto the to-be-modified substrates for surface modification; and conducting oxidative auto-polymerization for dopamine or its derivatives at 30-70° C., wherein the reaction time is determined by the coating degree required for surface modification;

2) Cross-linking solidification of the polydopamine coating layer for modification: after surface modification with polydopamine through step (1), washing the substrates to remove unpolymerized dopamine and/or its derivatives remaining on the surface; immersing the modified substrates into the cross-linking solution, or coating the cross-linking solution onto the modified substrates for solidification; and reacting at 30-90° C. for 3-6 h to complete cross-linking solidification of the coating layer of polymerized dopamine and/or its derivatives, to enhance the long-term stability of the coating layer for surface modification in organic solvents and acidic/alkalic environments.

The cross-linking agent used in the present invention could be paraformaldehyde, formaldehyde, acetaldehyde, glutaraldehyde, polyamine, epoxy olefins, and also can be the mixtures of more than two of the above curing agents.

The dopamine derivatives used in the present invention could be 3,4-dihydroxypheny-lalanine, 3,4-dihydroxypheny-methacrylamide, hydroquinone, 1,2-benzenediol, and also can be the mixtures of more than two of the above derivatives.

The surface modification solution used in the present invention, could be the solution of only one dopamine derivatives, and could be the solution of more than two of the dopamine derivatives. The modification solution might be an alkaline, a neutral or an acid system.

The substrate materials used in the present invention could be the inorganic materials, e.g., graphite, silica, carbon materials, ceramic materials or metal oxide, and the organic materials, e.g., polymers or bio-macromolecules, and metallic materials. The substrate morphologies can be particles, fibers, sticks, plates, networks and porous membranes, etc.

The beneficial effects of the present invention: After the cross-linking reaction between the curing agent and the active functional groups in coating layer, the soluble low-molecular-weight dopamine oligomers can be transformed into the insoluble three-dimensional stereographic networks, which can effectively enhance the interaction between polydopamine molecules and the adhesion between polydopamine coating layer and substrate materials. In this instance, the coating layer can be stable and effective for long-term utilization in severe environments, e.g., organic solvents and acidic/alkalic environments, and thereby greatly expand the application scope of the surface modification method based on dopamine polymerization.

REPRESENTATIVE APPLICATION CASES

In the following, the present invention is further described with the representative application cases in which the relevant figures and technical programs are illuminated.

Example 1

In this example, dopamine aqueous solution (2 g/L) under weakly alkaline condition (Tris-HCl buffer solution) is applied to conduct surface coating and hydrophilization for PVDF microporous membranes. Afterwards, the polydopamine coating layer are solidified by the cross-linking reaction with paraformaldehyde aqueous solution (10 g/L).

The detailed fabrication procedures are given as follows:

1) The surface modification solution is prepared by adding dopamine (0.10 g) and sodium iodate (0.02 g) into Tris-HCl buffer solution (50 ml, pH=8.5) in sequence, in which dopamine concentration is 2.0 g/L, and sodium iodate concentration is 0.4 g/L, respectively. Both dopamine and sodium iodate should be dissolved fully.

2) PVDF microporous membrane (diameter=90 mm, pore size=0.22 μm), which has been soaked in n-octanol for 3 hours, is immersed into the dopamine surface modification solution prepared in STEP (1), with the reaction temperature controlled to be 40° C. and reaction time equal to 8 hours.

3) After reaction in dopamine modification solution, membrane sample are transferred into deionized water to wash and remove unreacted dopamine molecules, and then heated for drying in an oven (60° C., 2 hours) to obtain the composite membranes with polydopamine coating layer.

4) The solution for cross-linking solidification is prepared by dissolving paraformaldehyde (0.5 g) into hydrochloric acid solution (50 ml, pH=2) fully.

5) The membrane sample with polydopamine coating layer, prepared in STEP (3), is immersed into the parafonnaldehyde solution prepared by STEP (4), for cross-linking solidification. The reaction temperature is 90° C. and the cross-linking solidification time is about 3 hours. In this instance, the paraformaldehyde cross-linked polydopamine coating layer is formed for the surface modification of PVDF microporous membrane.

6) The modified PVDF microporous membrane samples, respectively from STEP (3) and STEP (5) are immersed into DMSO, DMF, NMP and 1M NaOH solution to test the stability of hydrophilic coating layer in severe environments. The solvent or solution amount is about 20 mL for each test.

Figure 1:
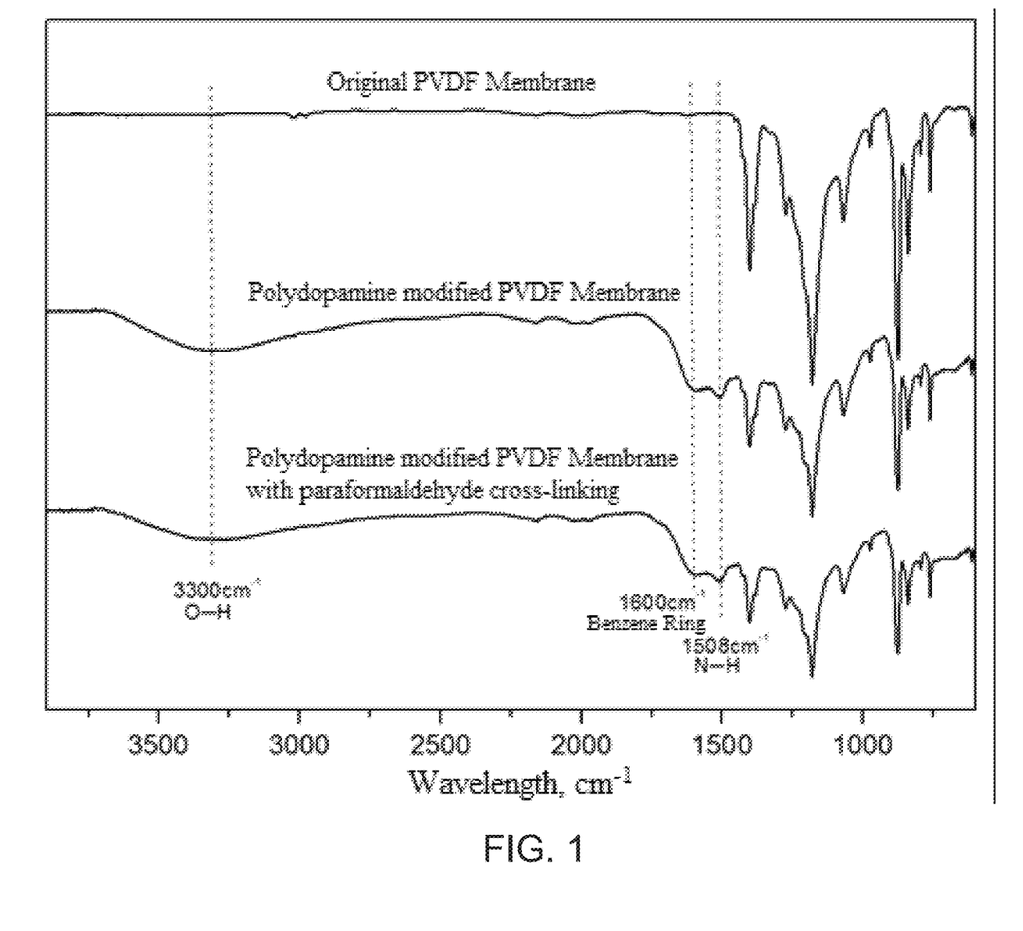
FIG. 1 is the infra-red spectrogram of the original, the polydopamine modified, as well as the polydopamine modified with paraformaldehyde cross-linking PVDF membranes.

The changes in functional groups respectively after the surface coating with polydopamine and the cross-linking solidification with paraformaldehyde for PVDF microporous membrane are shown in FIG. 1 with the infrared spectrum. According to the absorption peaks characteristic for N—H, O—H linkages and phenyl ring, polydopamine has been successfully deposited onto PVDF microporous membrane. Besides, the membrane samples before and after cross-linking solidification are almost the same in infrared spectrum, which indicates that the functional groups of polydopamine would be largely retained, so that the cross-linking solidification would not obviously change the hydrophilic ability of modified membranes.

Figure 2:
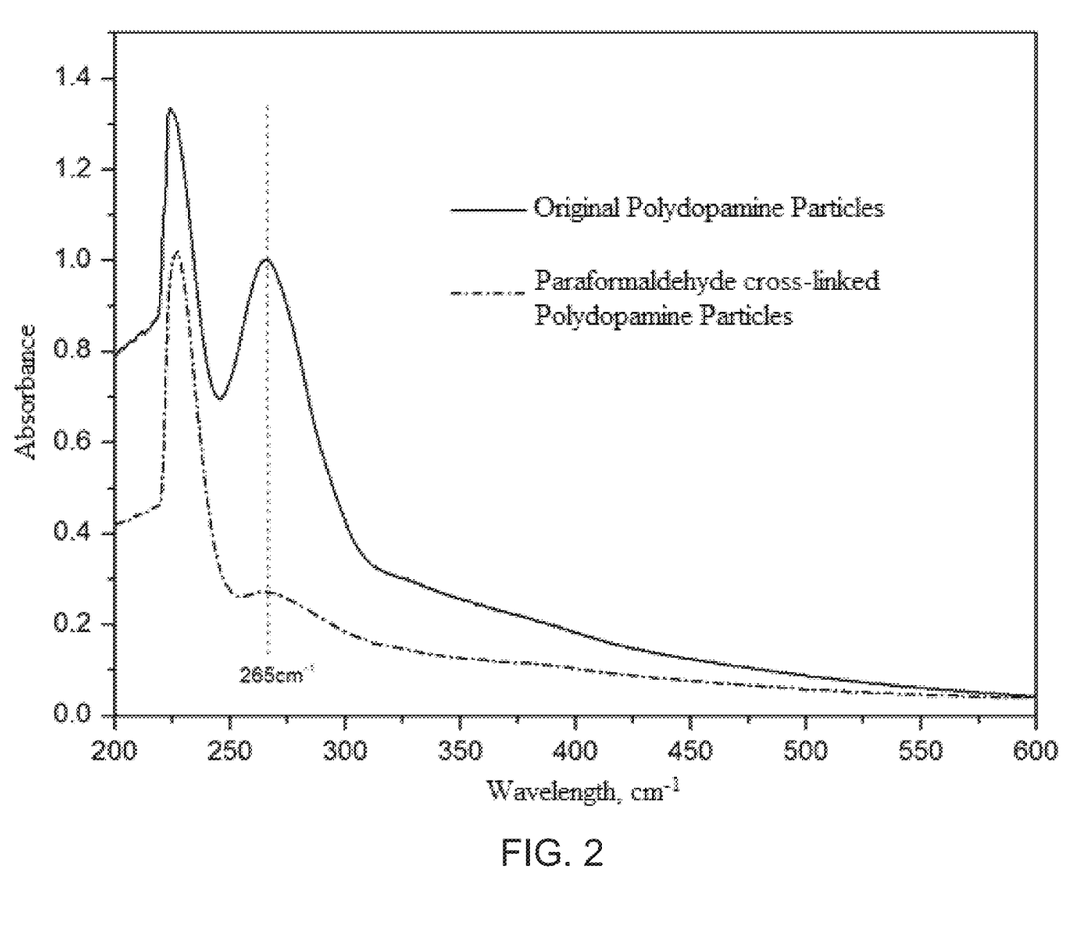
FIG. 2 is the ultraviolet spectrogram of polydopamine particles before and after cross-linking by paraformaldehyde in DMSO solution.

The original and the paraformaldehyde cross-linked polydopamine particles are immersed into DMSO solution to compare stability and solvent resistance. According to the amount dissolved into the organic solvent, reflected by ultraviolet spectrum in FIG. 2, the dissolution loss of polydopamine particles has been greatly reduced by paraformaldehyde cross-linking. This change can be ascribed to the successful transformation of the low-molecular-weight dopamine oligomers into the insoluble macromolecules with three-dimensional stereographic networks, which can tolerate the dissolution function of polar organic solvents, e.g., DMSO.

Figure 3:
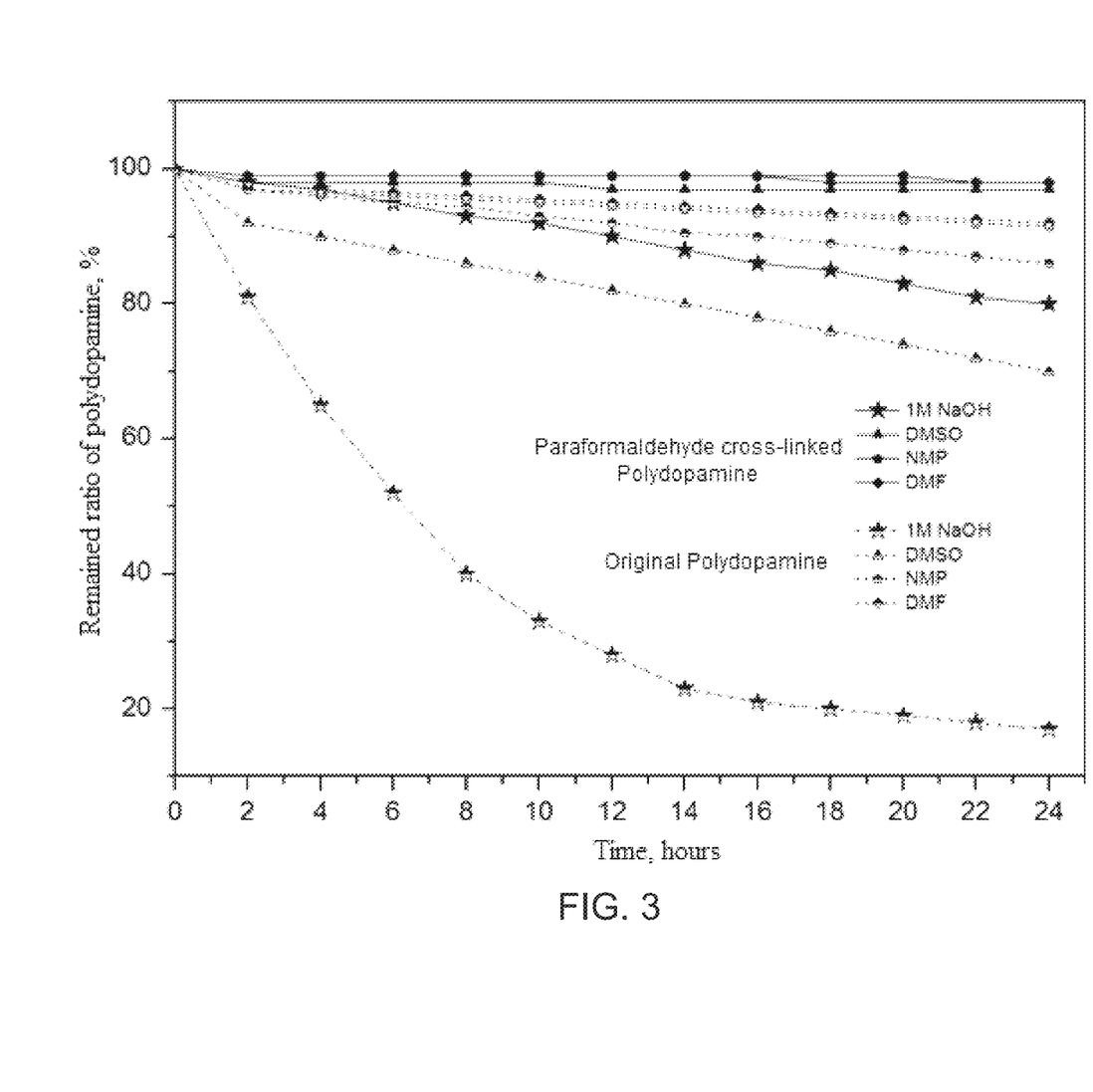
FIG. 3 is the change in remnant ratio along with the intensive dissolution tests in DMSO, NMP, DMF and 1M NaOH solution for polydopamine coating layers on PVDF membranes before and after paraformaldehyde cross-linking.

The results from the stability tests proceeded in STEP (6) are exhibited in FIG. 3, which further demonstrate that the cross-linking solidification with paraformaldehyde can obviously enhance the stability and solvent resistance in a variety of severe environments. As shown in FIG. 3, the original polydopamine coating layer can be dissolved by 10-20% after immersed into polar organic solvents (DMSO, NMP, DMF) for 24 hours, and more than 80% after immersed into 1M NaOH solution for 24 hours; the paraformaldehyde cross-linked polydopamine coating layer could be dissolved by less than 5% after immersed into polar organic solvents for 24 hours, and less than 20% after immersed into 1M NaOH solution for 24 hours. On the whole, the stability and solvent resistance have been enhanced obviously after paraformaldehyde cross-linking solidification for polydopamine coating layer on PVDF membranes.

Example 2

In this example, 3,4-dihydroxypheny-lalanine aqueous solution (3 g/L) under weakly alkaline condition (Tris-HCl buffer solution) is applied to conduct surface coating and hydrophilization for PVDF microporous membranes. Afterwards, the polydopamine coating layer are solidified by the cross-linking reaction with formaldehyde aqueous solution (10 vol %).

The detailed fabrication procedures are given as follows:
1) The surface modification solution is prepared by adding 3,4-dihydroxypheny-lalanine (0.15 g) and sodium iodate (0.02 g) into Tris-HCl buffer solution (50 mL, pH=8.5) in sequence, in which the concentration of 3,4-dihydroxypheny-lalanine is 3.0 g/L, and the concentration of sodium iodate is 0.4 g/L. Both 3,4-dihydroxypheny-lalanine and sodium iodate should be dissolved fully.
2) PVDF microporous membrane (diameter=90 mm, pore size=0.22 μm), which has been soaked in n-octanol for 3 hours, is immersed into the 3,4-dihydroxypheny-lalanine surface modification solution prepared in STEP (1), with the reaction temperature controlled to be 40° C. and reaction time equal to 12 hours.
3) After reaction in modification solution with 3,4-dihydroxypheny-lalanine, membrane sample are transferred into deionized water to wash and remove unreacted 3,4-dihydroxypheny-lalanine, and then heated for drying in an oven (60° C., 2 hours) to obtain the hydrophilic composite membranes with poly(3,4-dihydroxypheny-lalanine) coating layer.
4) The solution for cross-linking solidification is prepared by dissolving formaldehyde (5 mL) into hydrochloric acid solution (50 ml, pH=2) fully.
5) The membrane sample with poly(3,4-dihydroxypheny-lalanine) coating, prepared in STEP (3), is immersed into the formaldehyde solution prepared by STEP (4), for cross-linking solidification. The reaction temperature is 70° C., and the cross-linking solidification time is 6 hours. As a result, the formaldehyde cross-linked poly(3,4-dihydroxypheny-lalanine) coating layer is formed for the surface modification of PVDF microporous membrane.
6) The modified PVDF microporous membrane samples, respectively from STEP (3) and STEP (5) are immersed into 2M, 4M and 6M HCl solution to test the stability of hydrophilic coating layer in severe acidic environments. The solvent or solution for each test is about 20 mL.

Figure 4:
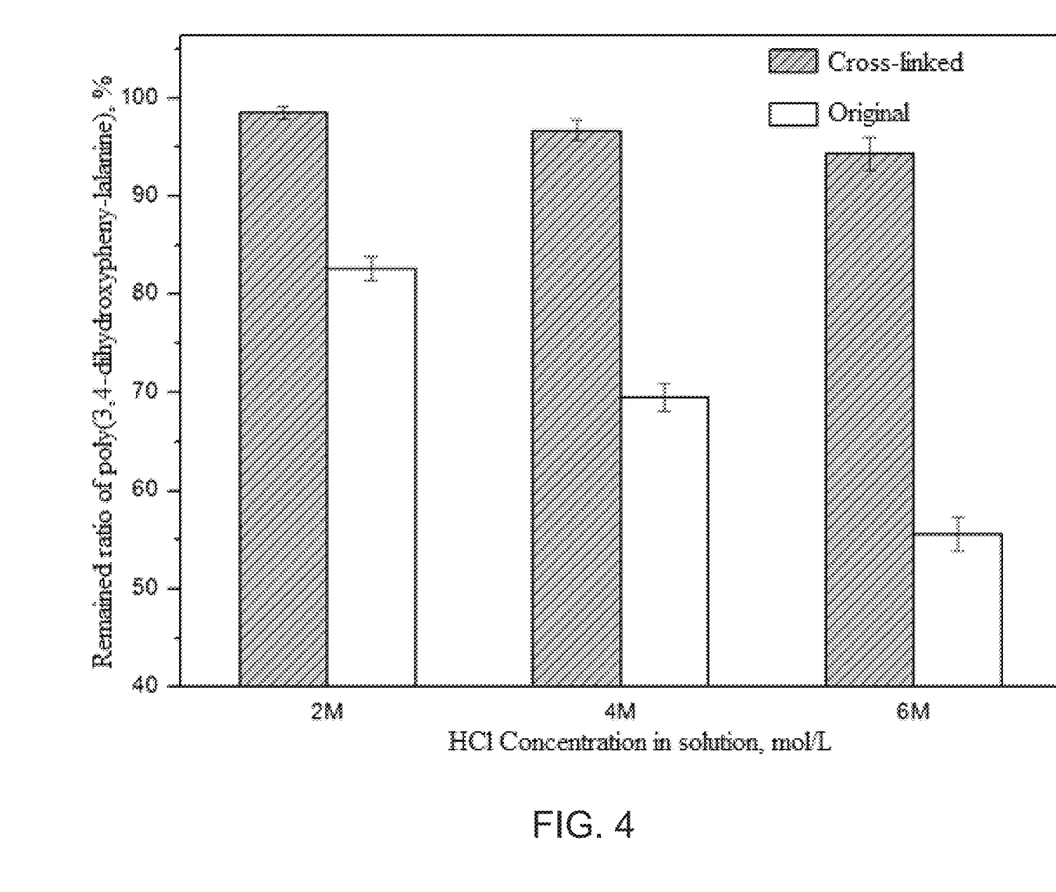
FIG. 4 is the remnant ratio after intensive dissolution tests (24 hours) in 2M, 4M and 6M HCl solutions for poly-3,4-dihydroxypheny-lalanine coating layers on PVDF membranes before and after cross-linking solidification.

The results about the stability experiments proceeded in STEP (6), including the original and the formaldehyde cross-linked poly(3,4-dihydroxypheny-lalanine) coating layers, are exhibited in FIG. 4, reflected by the change in poly(3,4-dihydroxypheny-lalanine) remained weight. The results demonstrate that the cross-linking solidification with formaldehyde could enhance the stability and solvent resistance obviously in severe acidic environments. In detail, the formaldehyde cross-linked poly(3,4-dihydroxypheny-lalanine) coating layer can be dissolved by less than 5% after immersing in 6M HCl solution for 24 hours. Much more, even after immersing in 6M HCl solution for 1 month, the weight loss is slightly increased to 5%.

Figure 5A:
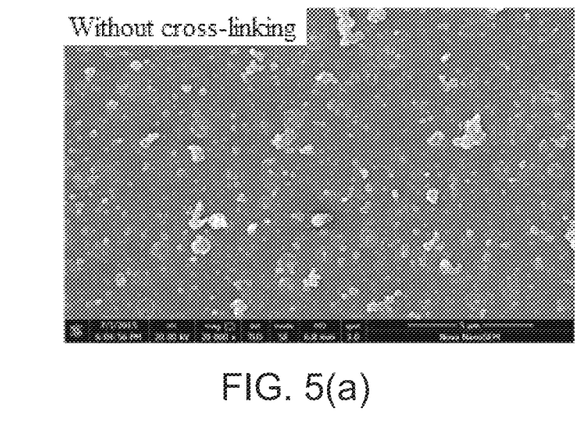
FIG. 5(a) is the SEM image of poly-3,4-dihydroxypheny-lalanine coating layer on PVDF membrane after intensive dissolution test in 2M HCl solution for 24 hours.
Figure 5B:
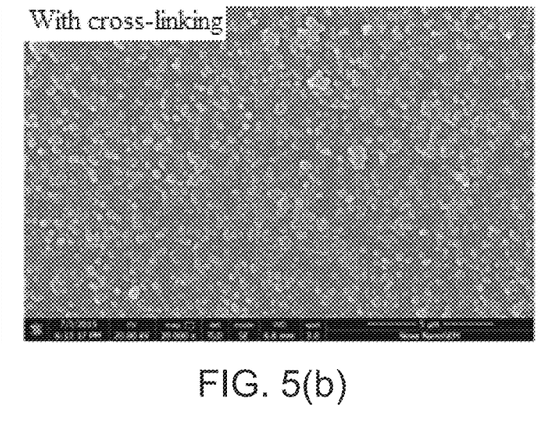
FIG. 5(b) is the SEM image of formaldehyde cross-linked poly-3,4-dihydroxypheny-lalanine coating layer on PVDF membrane after intensive dissolution test in 2M HCl solution for 24 hours.

The SEM images are used to further observe the influence of the cross-linking solidification on the stability of the poly(3,4-dihydroxypheny-lalanine) coating layer, as exhibited in FIG. 5. After immersing in 2M HCl solution for 24 hours, the microstructure of PVDF micorporous membrane with original poly(3,4-dihydroxypheny-lalanine) coating layer is shown by SEM image in FIG. 5a, while the microstructure of PVDF micorporous membrane with poly (3,4-dihydroxypheny-lalanine) coating layer after formaldehyde cross-linking is exhibited by SEM image in FIG. 5b. The original poly(3,4-dihydroxypheny-lalanine) coating layer has apparent phenomenon relating to dissolution loss and exfoliation after dissolution test, and the membrane surface becomes inhomogeneous and discontinuous. For the formaldehyde cross-linked poly(3,4-dihydroxypheny-lalanine) coating layer, one cannot observe the dissolution loss and exfoliation phenomenon obviously, and the membrane surface seems to be homogeneous and continuous. Overall, the solidification with formaldehyde cross-linking can enhance the stability of poly(3,4-dihydroxypheny-lalanine) coating layer in severe acidic environments evidently.

We claim:
1. A surface modification method based on the polymerization and cross-linking solidification of dopamine and/or its derivatives, comprising the following steps:
   1) Preparation of polydopamine coating layer for modification: immersing the to-be-modified substrates into the solution containing dopamine and/or its derivatives, or coating the solution containing dopamine or its derivatives onto the to-be-modified substrates for surface modification; and conducting oxidative auto-polymerization for dopamine or its derivatives at 30-70° C., wherein the reaction time is determined by the coating degree required for surface modification;

2) Cross-linking solidification of the polydopamine coating layer for modification: after surface modification with polydopamine through step (1), washing the substrates to remove unpolymerized dopamine and/or its derivatives remaining on the surface; immersing the modified substrates into the cross-linking solution, or coating the cross-linking solution onto the modified substrates for solidification; and reacting at 30-90° C. for 3-6 h to complete cross-linking solidification of the coating layer of polymerized dopamine and/or its derivatives, to enhance the long-term stability of the coating layer for surface modification in organic solvents and acidic/alkalic environments.

2. The surface modification method according to claim 1, wherein the dopamine derivatives are one or a mixture of more than two of 3,4-dihydroxypheny-lalanine, 3,4-dihydroxypheny-methacrylamide, hydroquinone and 1,2-benzenediol.

3. The surface modification method according to claim 1, wherein the cross-linking agent is one or a mixture of more than two of paraformaldehyde, formaldehyde, acetaldehyde, glutaraldehyde, polyamine and epoxy olefins.

4. The surface modification method according to claim 1, wherein the solution for surface modification contains one or a mixture of more than two of dopamine, and its derivatives; and the surface modification solution could be an alkaline system, a neutral medium or an acid system.

5. The surface modification method according to claim 3, wherein the surface modification solution contains one or a mixture of more than two of dopamine, and its derivatives; and the surface modification solution is an alkaline system, a neutral medium or an acid system.

6. The surface modification method according to claim 1, wherein the substrate materials can be inorganic materials, organic materials or metallic materials, and the morphologies of substrate materials could be particles, fibers, sticks, plates, networks or porous membranes.

7. The surface modification method according to claim 3, wherein the substrate materials could be inorganic materials, organic materials or metallic materials, and the morphologies of substrate materials could be particles, fibers, sticks, plates, networks or porous membranes.

8. The surface modification method according to claim 4, wherein the substrate materials could be inorganic materials, organic materials or metallic materials, and the morphologies of substrate materials could be particles, fibers, sticks, plates, networks or porous membranes.

9. The surface modification method according to claim 6, wherein the inorganic materials could be silica, graphite, carbon materials, ceramic materials or metallic oxide; and the organic materials could be polymers or bio-macromolecules.

10. The surface modification method according to claim 7, wherein the inorganic materials could be silica, graphite, carbon materials, ceramic materials or metallic oxide; and the organic materials could be polymers or bio-macromolecules.

\* \* \* \* \*